United States Patent
Lin et al.

(10) Patent No.: US 9,147,118 B2
(45) Date of Patent: Sep. 29, 2015

(54) IMAGE ALIGNMENT METHOD AND IMAGE ALIGNMENT SYSTEM

(71) Applicant: HTC Corporation, Taoyuan County (TW)

(72) Inventors: Ching-Fu Lin, Taoyuan County (TW); Chia-Wei Chiu, Taoyuan County (TW); Kuo-Hsien Liang, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 85 days.

(21) Appl. No.: 13/773,596

(22) Filed: Feb. 21, 2013

(65) Prior Publication Data
US 2013/0223763 A1    Aug. 29, 2013

Related U.S. Application Data

(60) Provisional application No. 61/602,612, filed on Feb. 24, 2012.

(51) Int. Cl.
*G06K 9/32* (2006.01)
*G06K 9/62* (2006.01)
*G06T 7/00* (2006.01)

(52) U.S. Cl.
CPC ............ *G06K 9/32* (2013.01); *G06K 9/6204* (2013.01); *G06T 7/0028* (2013.01); *G06T 2207/20016* (2013.01)

(58) Field of Classification Search
CPC ....... G06T 7/0028; G06T 7/0026; G06K 9/32
USPC ......... 382/294, 295, 139, 103, 106, 201, 199, 382/284, 260
See application file for complete search history.

(56) References Cited

U.S. PATENT DOCUMENTS

| | | | | |
|---|---|---|---|---|
| 5,581,638 | A * | 12/1996 | Givens et al. | 382/294 |
| 6,690,840 | B1 * | 2/2004 | Janko et al. | 382/294 |
| 7,991,196 | B2 * | 8/2011 | Tener et al. | 382/294 |
| 8,699,822 | B2 * | 4/2014 | Park et al. | 382/294 |
| 2010/0226592 | A1 * | 9/2010 | Ferguson | 382/294 |
| 2011/0069906 | A1 | 3/2011 | Park | |
| 2011/0116701 | A1 * | 5/2011 | Zhu et al. | 382/131 |
| 2011/0286631 | A1 * | 11/2011 | Wagner et al. | 382/103 |
| 2012/0033869 | A1 * | 2/2012 | Carlsen et al. | 382/131 |

OTHER PUBLICATIONS

Office action mailed on Sep. 24, 2014 for the Taiwan application No. 102104854, filing date: Feb. 7, 2013, pp. 1-8.

* cited by examiner

*Primary Examiner* — Shefali Goradia
*Assistant Examiner* — Pinalben Patel
(74) *Attorney, Agent, or Firm* — Winston Hsu; Scott Margo (57) ABSTRACT

An image alignment method includes steps of receiving a first image and a second image; scaling the first image and the second image by a ratio to generate a first downsized image and a second downsized image respectively; determining a first offset between the first downsized image and the second downsized image; selecting a first saliency region and a second saliency region from the first downsized image and the second downsized image; determining a second offset between a first sub-region within the first image and a second sub-region within the second image, the first sub-region and the second sub-region corresponding to the first saliency region and the second saliency region respectively; determining a final offset according to the ratio, the first offset and the second offset; and aligning the first image and the second image by the final offset.

16 Claims, 8 Drawing Sheets

IMAGE ALIGNMENT METHOD AND IMAGE ALIGNMENT SYSTEM

CROSS REFERENCE TO RELATED APPLICATIONS

This application claims the benefit of U.S. Provisional Application No. 61/602,612, which was filed on Feb. 24, 2012, and is incorporated herein by reference.

BACKGROUND OF THE INVENTION

1. Field of the Invention

The invention relates to an image alignment method and an image alignment system and, more particularly, to an image alignment method and an image alignment system capable of improving image alignment efficiency and reducing computation complexity.

2. Description of the Prior Art

Image alignment is an algorithm focused on geometrically matching two images with their contents for certain purposes such as erasing hand shaking when taking multiple pictures. Image alignment can be applied in lots of image processing domains such as high dynamic range preprocessing, video stabilization, multi-frame noise removal, multi-frame object removal, panorama stitching, etc. For certain real-time applications like on-device video stabilization for video recording, computing performance is a lot more critical when aligning two neighboring images. There are diverse theories and implements about two images alignment algorithm based on different purposes and applications. However, those prior arts always need much time to align two images due to complex computation.

SUMMARY OF THE INVENTION

The invention provides an image alignment method and an image alignment system to solve the aforesaid problems.

According to an embodiment of the invention, an image alignment method comprises steps of receiving a first image and a second image; scaling the first image and the second image by a ratio to generate a first downsized image and a second downsized image respectively; determining a first offset between the first downsized image and the second downsized image; selecting a first saliency region and a second saliency region from the first downsized image and the second downsized image; determining a second offset between a first sub-region within the first image and a second sub-region within the second image, the first sub-region and the second sub-region corresponding to the first saliency region and the second saliency region respectively; determining a final offset according to the ratio, the first offset and the second offset; and aligning the first image and the second image by the final offset.

According to another embodiment of the invention, an image alignment system comprises an image input module for receiving a first image and a second image; an image scaling module, coupled to the image input module and for scaling the first image and the second image by a ratio to generate a first downsized image and a second downsized image respectively; an offset determination module, configured to determine a first offset between the first downsized image and the second downsized image, select a first saliency region and a second saliency region from the first downsized image and the second downsized image respectively, determine a second offset between a first sub-region within the first image and a second sub-region within the second image, the first sub-region and the second sub-region corresponding to the first saliency region and the second saliency region respectively, and determine a final offset according to the ratio, the first offset and the second offset; and an image alignment module, configured to align the first image and the second image according to the final offset.

According to another embodiment of the invention, an image alignment method comprises steps of scaling a first image and a second image into a first downsized image and a second downsized image by a ratio; determining a first offset between the first downsized image and the second downsized image; cropping a first sub-region and a second sub-region from the first image and the second image respectively; wherein the first sub-region and the second sub-region comprising distinct feature from other regions; determining a second offset between the first sub-region and the second sub-region; determining a final offset according to the ratio, the first offset and the second offset; and aligning the first image and the second image by the final offset.

As mentioned in the above, the invention downsizes the first and second images and utilizes the first and second downsized images to determine the first offset (i.e. rough estimation) and the second offset (i.e. fine estimation) so as to determine the final offset by combination of the first and second offsets. Since the first offset is determined by the first and second downsized images and the second offset is determined by parts of the first and second images (i.e. the first and second sub-regions) rather than the whole of them, image alignment efficiency can be improved and computation complexity can be reduced accordingly. It should be noted that for aligning two images taken in a very close timing, factors like scaling and relative rotating angle would be ignore in the invention for simplifying whole procedure.

These and other objectives of the present invention will no doubt become obvious to those of ordinary skill in the art after reading the following detailed description of the preferred embodiment that is illustrated in the various figures and drawings.

DETAILED DESCRIPTION

The invention discloses an efficient method to measure geometric offset between two images with their contents by combination of rough estimation and fine estimation. The invention focuses the objective on measuring geometric offset between two images without obvious difference in scale and relative angle. Therefore, the invention proposes a method of two-pass fast image alignment. Performance can be greatly improved since only parts of the two images require fine analysis. By extracting feature (e.g. edge features) of the partial images and applying the result to original images, computation complexity is reduced.

Figure 1:
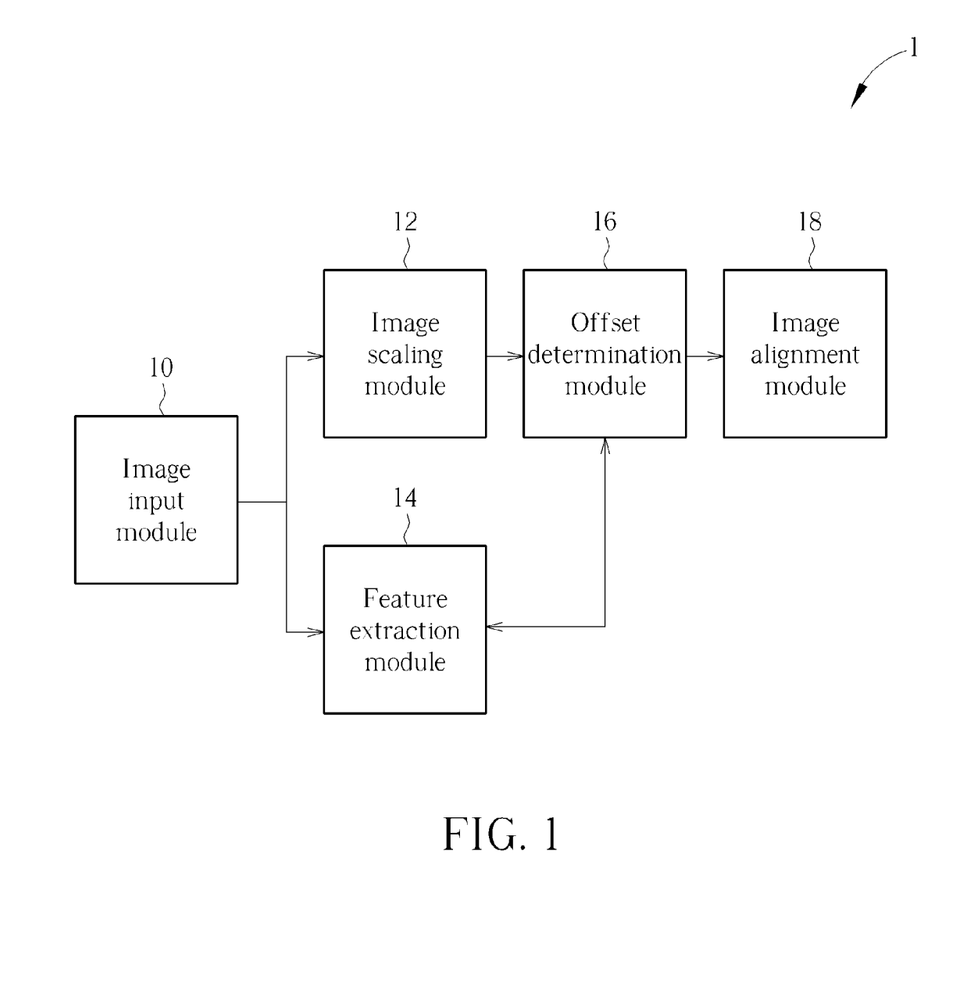
FIG. 1 is a functional block diagram illustrating an image alignment system according to an embodiment of the invention.
Figure 2:
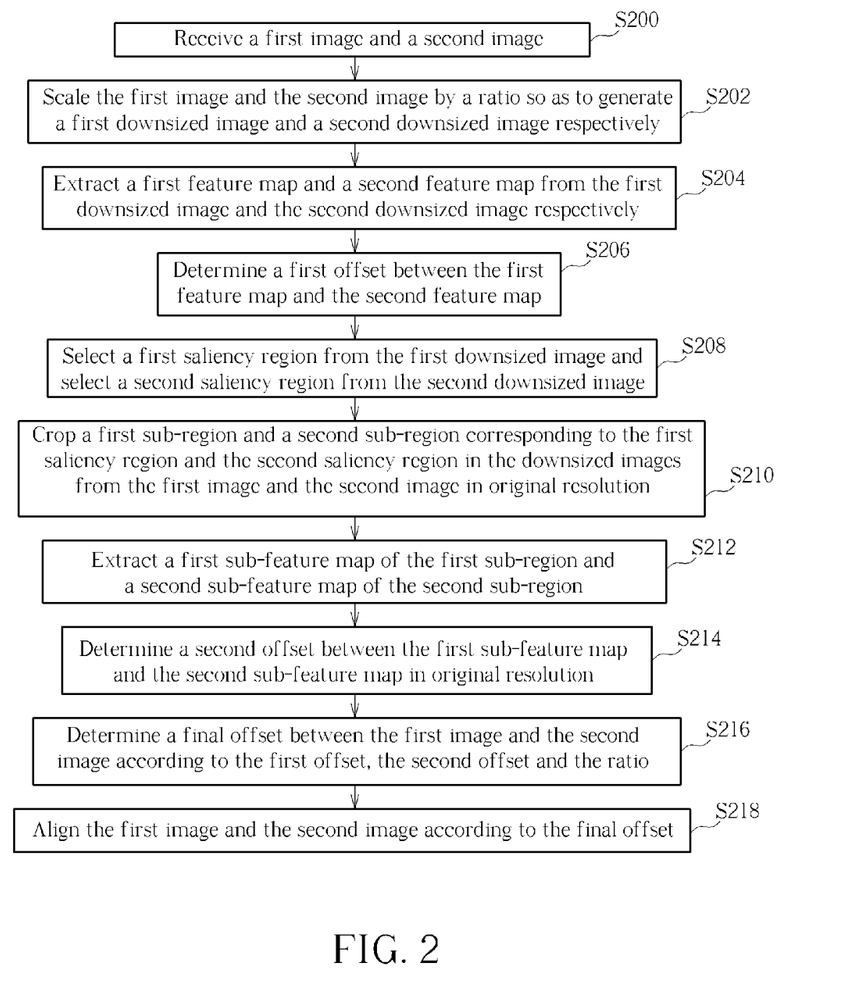
FIG. 2 is a flowchart illustrating an image alignment method according to an embodiment of the invention.

Referring to FIGS. 1 and 2, FIG. 1 is a functional block diagram illustrating an image alignment system 1 according to an embodiment of the invention, and FIG. 2 is a flowchart illustrating an image alignment method according to an embodiment of the invention. The image alignment method shown in FIG. 2 can be implemented by the image alignment system 1 shown in FIG. 1. The image alignment system 1 and the image alignment method of the invention can be applied in lots of image processing domains such as high dynamic range preprocessing, video stabilization, multi-frame noise removal, multi-frame object removal, panorama stitching, anti-hand shaking, etc.

As shown in FIG. 1, the image alignment system 1 comprises an image input module 10, an image scaling module 12, a feature extraction module 14, an offset determination module 16 and an image alignment module 18. The image input module 10 is configured to receive images from various sources. In one embodiment of the invention, the image input module 10 may be an input interface and receive image input from a camera sensor module (not shown), a memory unit (not shown), and/or other image sources. In another embodiment of the invention, the image input module 10 may be an image capture module capable of capturing images directly, such as a camera sensor module. The image scaling module 12 is configured to change the size or resolution of the input image, such as down-size, up-size, down-sample and/or up-sample, etc. In the embodiment of the invention, the image scaling module 12 is configured to scale the images according to a predetermined ratio. Feature extraction module 14 is configured to receive images in original resolution and scaled resolution, and perform suitable process to obtain feature maps of the images that represent specific characteristics such as edge, contrast, brightness, etc. In one embodiment of the invention, the feature extraction module 14 may perform edge detection to obtain edge information of objects in the image. While in another embodiment of the invention, the feature extraction module 14 may perform blob detection to achieve similar purposes. The scaled images and/or partial images are then sent to the offset determination module 16 to obtain an offset between two corresponding images, for example right image and left image of a 3D image, previous and current image frame of a video file, etc. The offset determination module 16 may compare the two images by feature mapping and obtain a distance offset, rotation offset, and/or angle offset among the two images. In one embodiment of the invention, the image input module 10, the image scaling module 12, the feature extraction module 14, the offset determination module 16 and the image alignment module 18 can be implemented by software, hardware or the combination thereof. In another embodiment of the invention, the image input module 10, image scaling module 12, feature extraction module 14, offset determination module 16 and image alignment module 18 may be implemented in an image signal processor.

To improve the performance of image alignment, the invention discloses a two-pass image alignment in two different resolutions. In the first pass, a rough estimation is made in lower resolution to reduce the computation load. However, this can only provide course offset and lacks of precision. In the second pass, a fine estimation is made on partial regions with significant distinctions in original resolution. It can be understood by one with ordinary skill in the art that comparing two full images in original resolution may be time consuming and occupy processing resource. Therefore, by performing rough comparison of downscaled images in lower resolution and fine comparison of partial images in full resolution may reduce computation load and still preserve accuracy.

FIG. 2 illustrates an image alignment method according to an embodiment of the invention. As shown in FIG. 2, first of all, step S200 is performed to receive a first image and a second image. The first and the second images may be received from an image sensor module, a storage unit or other transmission interface module. Afterward, step S202 is performed to scale the first image and the second image by a ratio R so as to generate a first downsized image and a second downsized image respectively. The ratio R may be selected according to system requirement and/or original resolution. In step S204, a first feature map and a second feature map are extracted from the first downsized image and the second downsized image respectively. The feature maps can be extracted by, for example, edge detection, corner detection, thresholding and/or other algorithms known in the art. In another embodiment of the invention, the feature map extraction 14 may be performed on partial areas of the downsized images to further reduce the computation. Step S206 is then performed to determine a first offset between the first feature map and the second feature map. The first offset may be determined by comparing distance of positions of corresponding pixels in the first feature map and the second feature map. In an embodiment of the invention, the first offset may be calculated from the combination of all or partial pixels within the feature maps. For example, the first offset may be calculated by minimizing an equation representing the distance between corresponding pixels in the feature maps. Yet in another embodiment of the invention, the first offset may be calculated in separate dimensions. By downsizing the first image and the second image, the computation load of calculation of the first offset can be greatly reduced. Similarly, extracting the feature map from the downsized image further reduces the amount of computations and improves the efficiency. The first offset may be later restored with the ratio R to reflect the distance of the images in original resolution.

Step S208 is then performed to select a first saliency region from the first downsized image and select a second saliency region from the second downsized image. The first saliency region and the second saliency region may be determined by extracting a region most or more significant than other regions. The saliency region may comprise a relative small edge with distinct feature, such as a partial edge of an object with distinct contrast. Still in another embodiment of the invention, the saliency region may be selected as distinct common objects identified in the images. In step S210, a first sub-region and a second sub-region corresponding to the first saliency region and the second saliency region in the downsized images are cropped from the first image and the second image in original resolution. Please note that determining the saliency region in downsized image may reduce the effort thus improve efficiency. Once the saliency region is determined, corresponding sub-region can be identified and cropped from the original images. Then in step S212, a first sub-feature map of the first sub-region and a second sub-feature map of the second sub-region are extracted. As described above, the first offset is determined by downsized images and thus can only reflect rough distance between the first image and the second image. Therefore, by extracting sub-feature map of a small area in original resolution may provide more details for precise comparison and reduce the computation complexity. Step S214 is then performed to determine a second offset between the first sub-feature map and the second sub-feature map in original resolution. Similar to the determination of the first offset, the second offset may be calculated from the combination of all or partial pixels within the feature maps and/or in separate dimensions. And in step S216, a final offset between the first image and the second image is determined according to the first offset, the second offset and the ratio R. As described above, the first offset is determined in downsized image. Therefore the coarse offset of the first and second image in original resolution can be restored by scaling back with ratio R, i.e. D×R. Adding the coarse offset D×R with the second offset, the final offset can be thus obtained. Finally in step S218, the first image and the second image may be aligned according to the final offset.

It can be observed from the aforesaid image alignment method shown in FIG. 2, the first offset (i.e. rough estimation) is determined based on the first and second downsized images in lower resolution and the second offset (i.e. fine estimation) is determined based on the first and second sub-regions of the first and second images in original resolution. The first offset is restored back to original scale by the ratio and combined with the second offset, and thus the final offset can be obtained without performing comparison or analysis on full image of full resolution.

In the following, an embodiment is depicted along with the image alignment system 1 shown in FIG. 1 and the image alignment method shown in FIG. 2 so as to show technical features of the invention.

Figure 3:
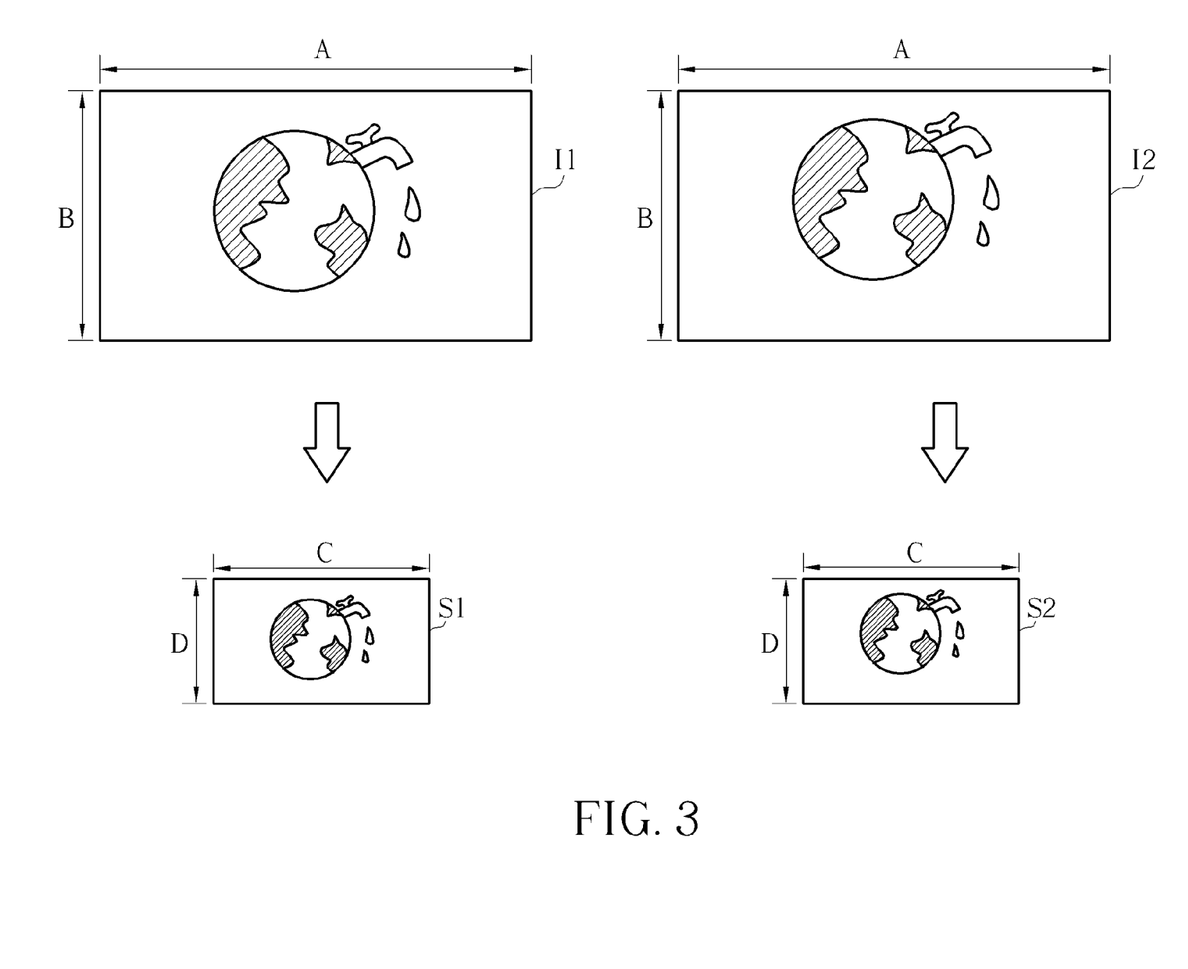
FIG. 3 is a schematic diagram illustrating a first image and a second image being downsized to generate a first downsized image and a second downsized image, respectively.
Figure 4:
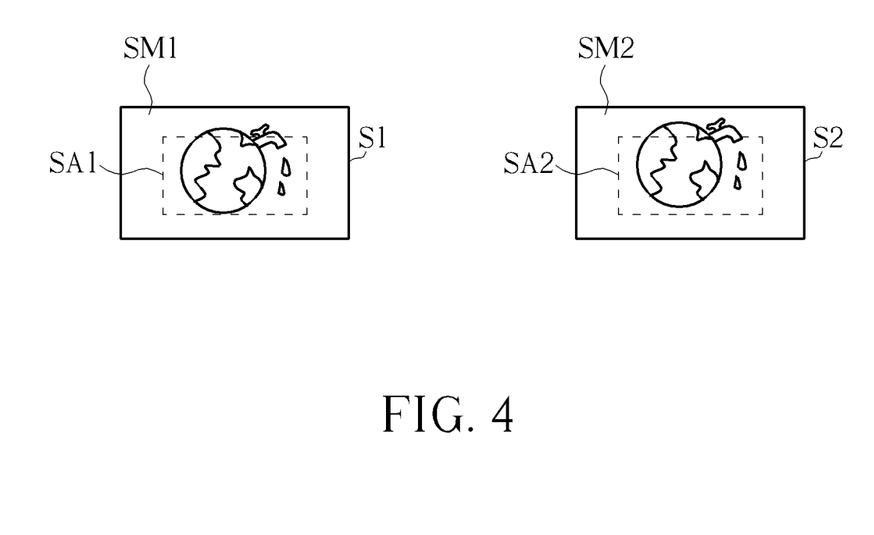
FIG. 4 is schematic diagram illustrating how to determine a first offset between the first downsized image and the second downsized image.
Figure 5:
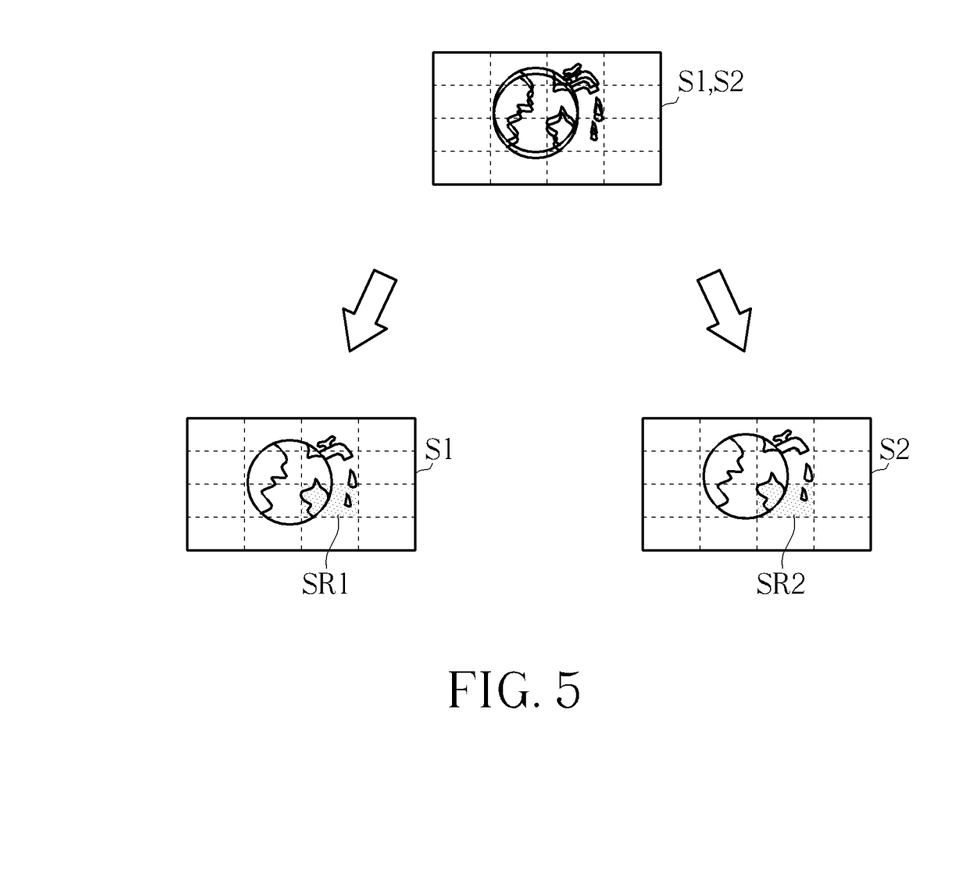
FIG. 5 is a schematic diagram illustrating how to select a first saliency region from the first downsized image and select a second saliency region from the second downsized image.
Figure 6:
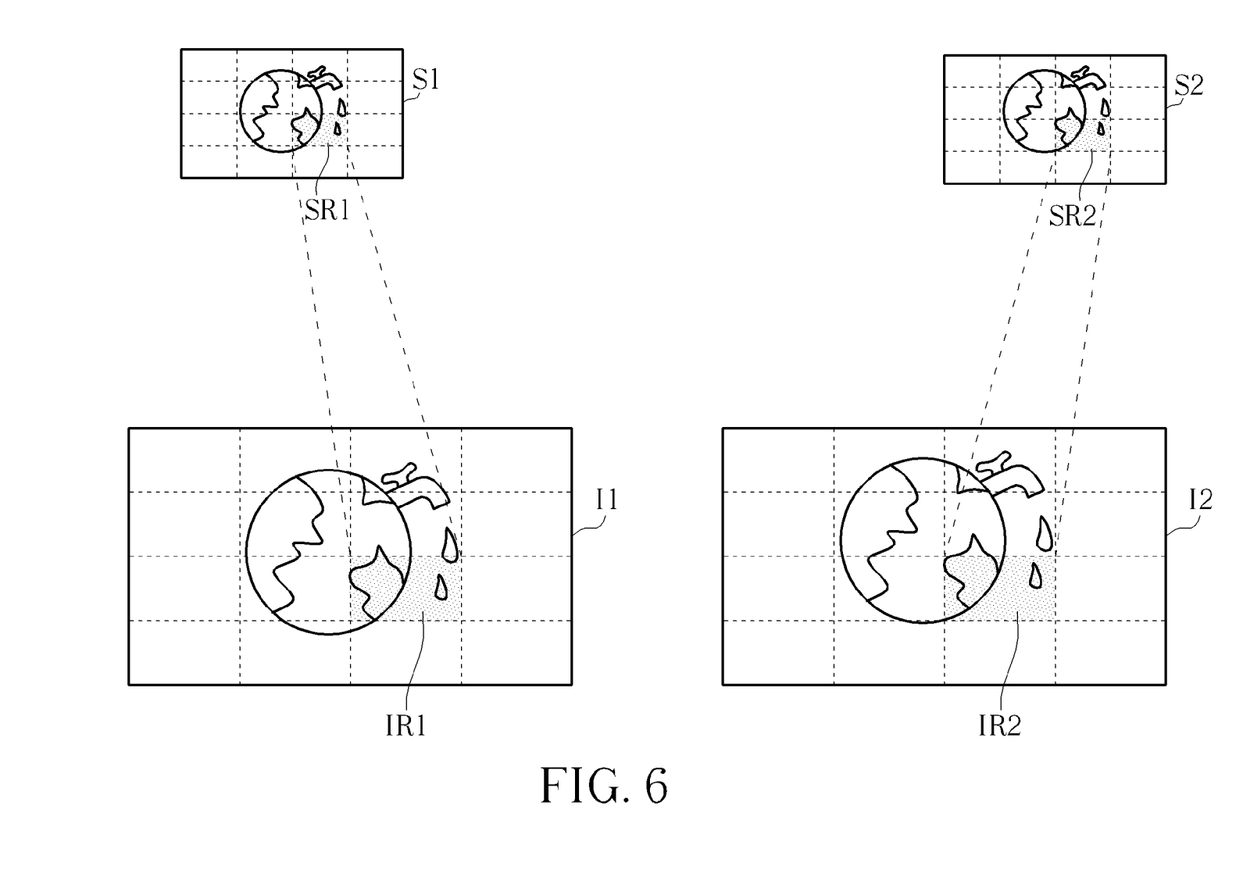
FIG. 6 is a schematic diagram illustrating a first sub-region, which corresponds to the first saliency region, being cropped from the first image and a second sub-region, which corresponds to the second saliency region, being cropped from the second image.
Figure 7:
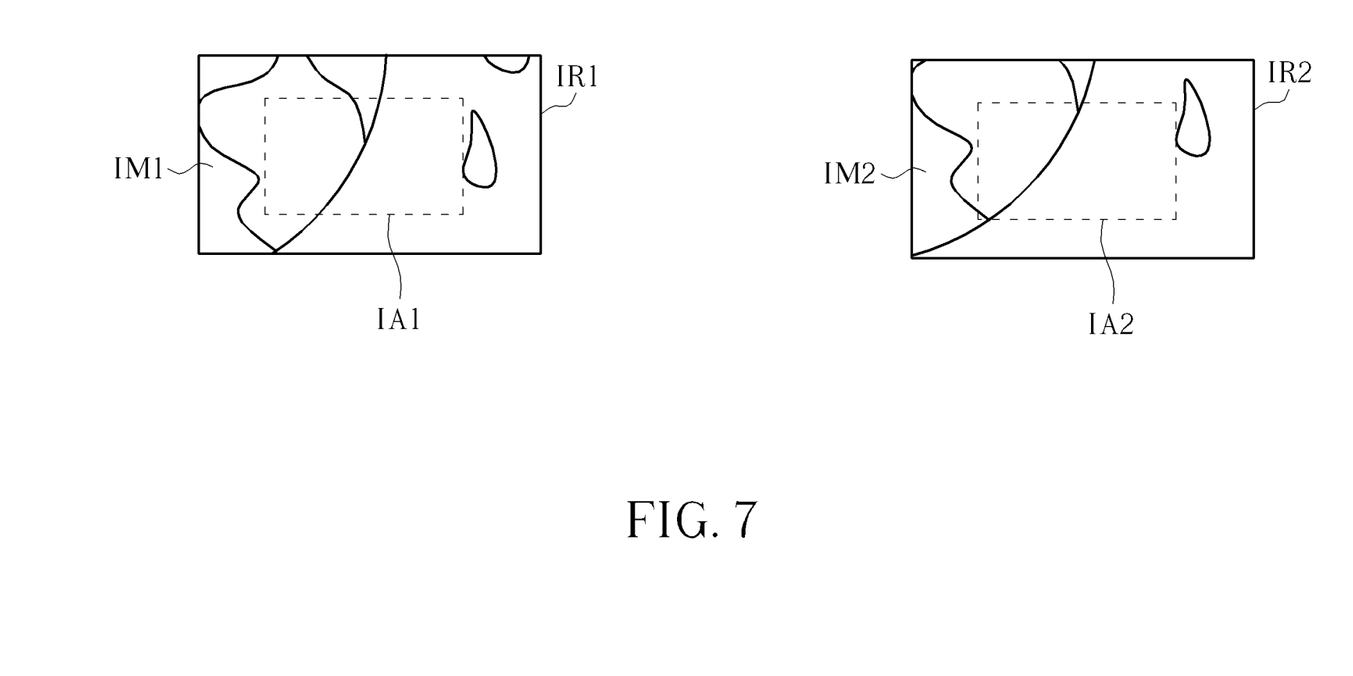
FIG. 7 is a schematic diagram illustrating how to determine a second offset between the first sub-region and the second sub-region.
Figure 8:
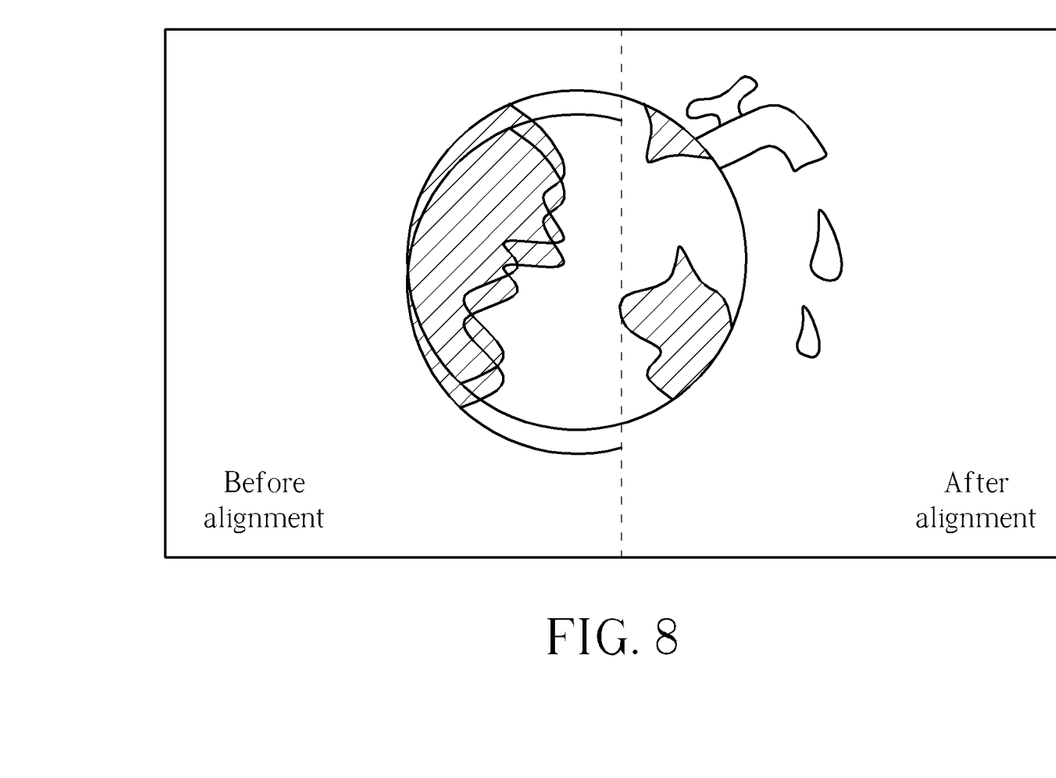
FIG. 8 is a schematic diagram illustrating the first image and the second image before and after alignment.

Referring to FIGS. 3 to 8, FIG. 3 is a schematic diagram illustrating a first image I1 and a second image I2 being downsized to generate a first downsized image S1 and a second downsized image S2, respectively. FIG. 4 is a schematic diagram illustrating how to determine a first offset between the first downsized image S1 and the second downsized image S2. FIG. 5 is a schematic diagram illustrating how to select a first saliency region SR1 from the first downsized image S1 and select a second saliency region SR2 from the second downsized image S2. FIG. 6 is a schematic diagram illustrating a first sub-region IR1, which corresponds to the first saliency region SR1, being cropped from the first image I1 and a second sub-region IR2, which corresponds to the second saliency region SR2, being cropped from the second image I2. FIG. 7 is a schematic diagram illustrating how to determine a second offset between the first sub-region IR1 and the second sub-region IR2, and FIG. 8 is a schematic diagram illustrating the first image I1 and the second image I2 before and after alignment.

With reference to FIG. 1, the image input module 10 receives a first image I1 and a second image I2 and the image scaling module 12 scales the first image I1 and the second image I2 by a ratio R so as to generate a first downsized image S1 and a second downsized image S2 respectively, as shown in FIG. 3. For example, provided that size of each of the first image I1 and the second image I2 is A*B and size of each of the first downsized image S1 and the second downsized image S2 is C*D, the ratio R is equal to C/A and D/B.

Then, the invention utilizes two-pass offset estimation for image alignment. In the first pass, the feature extraction module 14 extracts a first feature map SM1 from the first downsized image S1 and extracts a second feature map SM2 from the second downsized image S2, as shown in FIG. 4. In this embodiment, the first feature map SM1 represents, but not limited to, edge features of the first downsized image S1 by edge feature mapping algorithm known in the art and the second feature map SM2 represents, but not limited to, edge features of the second downsized image S2 by edge feature mapping algorithm known in the art.

Then, the offset determination module 16 compares the first feature map SM1 and the second feature map SM2 to determine first offset. The first offset can be determined by N first candidate offsets between N reference area SA1 and N candidate areas SA2 within the first feature map SM1 and the second feature map SM2 respectively, wherein N is a positive integer. In this embodiment, the reference area SA1 can be set at a center of the first feature map SM1 initially and covers a specific percentage of the first feature map SM1 (e.g. 10%, 30%, 50%, 100%, etc.), and the candidate area SA2 can be set at a center of the second feature map SM2 initially and covers a specific percentage of the second feature map SM1 (e.g. 10%, 30%, 50%, 100%, etc.) same as the first reference area SA1. Then, the candidate area SA2 are moved in the second feature map SM2 horizontally and vertically so as to find a specific position with most features and least errors between the reference area SA1 and the candidate area SA2. Then, one first candidate offset between the reference area SA1 and the candidate area SA2 can be determined based on their coordinates. Then, the reference area SA1 are moved in the first feature map SM1 horizontally and vertically and the aforesaid algorithm is performed repeatedly N times so as to obtain N first candidate offsets between N reference areas SA1 and N candidate areas SA2.

Then, the offset determination module 16 selects the minimum one of the N first candidate offsets to be a first offset.

In the second pass, the offset determination module 16 aligns the first downsized image S1 and the second downsized image S2 by the first offset, which is determined in the first pass as mentioned above. Then, the offset determination module 16 slices the first downsized image S1 into Q*R first blocks and slices the second downsized image S2 into Q*R second blocks, wherein Q and R are positive integers. As shown in the embodiment of FIG. 5, the offset determination module 16 slices the first downsized image S1 and the second downsized image S2 into 4*4 blocks respectively. However, the invention is not limited to this embodiment. Then, the offset determination module 16 calculates Q*R gradient of sum of absolute differences (SADs) between the Q*R first blocks and the Q*R second blocks horizontally and vertically. It should be noted that the gradient of SAD represents the significance on SAD with respect to horizontal/vertical motion performed. Therefore, given the SAD matrix A, the significance matrix E can be calculated by the following equation 1.

$$E = \nabla A.​​​​​​​​​​​​​​​​​​​​​​​​​​​​​​​​​​​​​​​​​​​​​​​​​​​​​​​​​​ \qquad \text{Equation 1:}$$

The block of the first downsized image S1 with the maximum significance in the significance matrix E can be represented as a first saliency region SR1. In other words, the offset determination module 16 selects one of the Q*R first blocks which has the maximum gradient of SADs to be the first saliency region SR1. Then, the offset determination module 16 shifts the first saliency region SR1 by the first offset to obtain a second saliency region SR2. Similarly, the SAD operation may be performed on the second downsized image S2 to find the second saliency region SR2, and locates the first saliency region SR1 in the first downsized image S1 by the first offset accordingly.

Then, as shown in FIG. 6, the offset determination module 16 crops a first sub-region IR1 corresponding to the first saliency region SR1 from the first image I1 and a second sub-region IR2 which corresponding to the second saliency region SR2 from the second image I2 according to the ratio R. The offset determination module 16 may locate the position of the first sub-region IR1 and second sub-region IR2 by scaling back the position of first saliency region SR1 and the second saliency region SR2.

Now turn to FIG. 7. Upon obtaining the first sub-region IR1 and the second sub-region IR2, the feature extraction module 14 obtains a first sub-feature map IM1 corresponding to the first sub-region IR1 from the first image I1 and a second sub-feature map IM2 corresponding to the second sub-region IR2 from the second image I2 by feature extraction algorithm known in the art, such as edge detection. In this embodiment, the first sub-feature map IM1 represents, but not limited to, edge features of the first sub-region IR1 and the second sub-feature map IM2 represents, but not limited to, edge features of the second sub-region IR2. The first sub-feature map IM1 and the second sub-feature map IM2 may be extracted from the feature maps of the first image I1 and the second image I2 respectively by the feature extraction module 14. In another embodiment of the invention, the feature extraction module 14 may extract the first sub-feature map IM1 and the second sub-feature map IM2 by processing the first saliency region SR1 and the second saliency region SR2 directly.

Then, the offset determination module 16 compares M first sub-areas IA1 within the first sub-feature map IM1 with M second sub-areas IA2 within the second sub-feature map IM2 to determine M second candidate offsets, wherein M is a positive integer. In this embodiment, the first sub-area IA1 can be set at a center of the first sub-feature map IM1 initially and covers a specific percentage of the first sub-feature map IM1 (e.g. 10%, 30%, 50%, 100%, etc.), and the second sub-area IA2 can be set at a center of the second sub-feature map IM2 initially and covers a specific percentage of the second sub-feature map IM2 (e.g. 10%, 30%, 50%, 100%, etc.) same as the first area IA1. Then, the second sub-area IA2 are moved in the second sub-feature map IM2 horizontally and vertically so as to find a specific position with most features and least errors between the first sub-area IA1 and the second sub-area IA2 of the first sub-feature map IM1 and the second sub-feature map IM2 respectively. Consequently, one second candidate offset between the first sub-area IA1 and the second sub-area IA2 can be determined based on their coordinates. Then the first sub-area IA1 is moved in the first sub-feature map IM1 horizontally and vertically and the aforesaid algorithm is performed repeatedly M times so as to obtain M second candidate offsets between M first sub-areas IA1 and M second sub-areas IA2. And lastly the offset determination module 16 selects the minimum one of the M second candidate offsets to be the second offset in the second pass. Once obtaining the first offset in the first pass and the second offset in the second pass, the offset determination module 16 can determine a final offset by the following equation 2.

$$Df=D1*R+D2. \qquad \text{Equation 2:}$$

In equation 2, Df represents the final offset, D1 represents the first offset, R represents the ratio and D2 represents the second offset.

Finally, the image alignment module 18 can align the first image I1 and the second image I2 by the final offset Df. In this embodiment, the image alignment module 18 can shift one of the first image I1 and the second image I2 with the final offset Df so as to align the first image I1 and the second image I2.

Furthermore, above mentioned processing modules of the image alignment method shown in FIG. 2 can be implemented by software. The software can be executed in any electronic devices equipped with the image alignment system 1 shown in FIG. 1. Still further, each part or function of the processing modules may be implemented by software, hardware or the combination thereof. Moreover, the processing modules of the image alignment method shown in FIG. 2 can be embodied by a computer readable storage medium, wherein the computer readable storage medium stores instructions which can be executed by at least a hardware processor of an electronic device so as to generate control command for controlling the image alignment system 1 to execute corresponding function.

As mentioned in the above, the invention scales the first and second images into smaller sizes and utilizes the images in different resolutions to determine the first offset (i.e. rough estimation) and the second offset (i.e. fine estimation) to determine the final offset by combination of the first and second offsets. Since the first offset is determined by the first and second downsized images and the second offset is determined by parts of the first and second images (i.e. the first and second sub-regions) rather than the whole of them, image alignment efficiency can be improved and computation complexity can be reduced accordingly. It should be noted that for aligning two images taken in a very close timing, factors like scaling and relative rotating angle would be ignore in the invention for simplifying whole procedure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image alignment method, comprising steps of:
receiving a first image and a second image;
scaling the first image and the second image by a ratio to generate a first downsized image and a second downsized image respectively;
determining a first offset between the first downsized image and the second downsized image;
selecting a first saliency region and a second saliency region from the first downsized image and the second downsized image;
determining a second offset between a first sub-region within the first image and a second sub-region within the second image, the first sub-region and the second sub-region corresponding to the first saliency region and the second saliency region respectively;
determining a final offset according to the ratio, the first offset and the second offset; and
aligning the first image and the second image by the final offset;
wherein the final offset is determined by an equation as follows:

$$Df=D1*R+D2;$$

wherein Df represents the final offset, D1 represents the first offset, R represents the ratio and D2 represents the second offset.

2. The image alignment method of claim 1, wherein the step of determining a first offset between the first downsized image and the second downsized image comprises steps of:
extracting a first feature map and a second feature map from the first downsized image and the second downsized image respectively;
comparing N reference areas and N candidate areas within the first feature map and the second feature map respectively to determine N first candidate offsets, wherein N is a positive integer; and selecting a minimum one of the N first candidate offsets as the first offset.

3. The image alignment method of claim 2, wherein the first feature map and the second feature map represent edge features of the first downsized image and the second downsized image respectively.

4. The image alignment method of claim 1, wherein the step of selecting a first saliency region and a second saliency region from the first downsized image and the second downsized image comprises steps of:
  aligning the first downsized image and the second downsized image by the first offset;
  slicing the first downsized image into Q*R first blocks and slicing the second downsized image into Q*R second blocks, wherein Q and R are positive integers;
  calculating Q*R gradient of sum of absolute differences between the Q*R first blocks and the Q*R second blocks horizontally and vertically;
  selecting one of the Q*R first blocks having maximum gradient of sum of absolute differences as the first saliency region; and
  shifting the first saliency region by the first offset to obtain the second saliency region.

5. The image alignment method of claim 1, wherein the step of determining a second offset between a first sub-region and a second sub-region comprises steps of:
  cropping the first sub-region and the second sub-region from the first image and the second image;
  extracting a first sub-feature map and a second sub-feature map from the first sub-region and the second sub-region respectively;
  comparing M first sub-areas of the first sub-feature map with M second sub-areas of the second sub-feature map to determine M second candidate offsets between the M first sub-areas and the M second sub-areas, wherein M is a positive integer; and
  selecting a minimum one of the second candidate offsets as the second offset.

6. The image alignment method of claim 5, wherein the first sub-feature map and the second sub-feature map represent edge features of the first sub-region and the second sub-region respectively.

7. An image alignment system, comprising:
  an image input module for receiving a first image and a second image;
  an image scaling module, coupled to the image input module and for scaling the first image and the second image by a ratio to generate a first downsized image and a second downsized image respectively;
  an offset determination module, configured to determine a first offset between the first downsized image and the second downsized image, select a first saliency region and a second saliency region from the first downsized image and the second downsized image respectively, determine a second offset between a first sub-region within the first image and a second sub-region within the second image, the first sub-region and the second sub-region corresponding to the first saliency region and the second saliency region respectively, and determine a final offset according to the ratio, the first offset and the second offset; and
  an image alignment module, configured to align the first image and the second image according to the final offset;
  wherein the final offset is determined by an equation as follows:

$$Df=D1*R+D2;$$

wherein Df represents the final offset, D1 represents the first offset, R represents the ratio and D2 represents the second offset.

8. The image alignment system of claim 7, further comprising a feature extraction module configured to extract a first feature map and a second feature map from the first downsized image and the second downsized image respectively; wherein the offset determination module is further configured to compare N reference areas and N candidate areas within the first feature map and the second feature map respectively to determine N first candidate offsets, and select a minimum one of the N first candidate offsets to be the first offset, wherein N is a positive integer.

9. The image alignment system of claim 8, wherein the first feature map and the second feature map represent edge features of the first downsized image and the second downsized image respectively.

10. The image alignment system of claim 7, wherein the offset determination module is further configured to align the first downsized image and the second downsized image by the first offset, slice the first downsized image into Q*R first blocks, slice the second downsized image into Q*R second blocks, calculate Q*R gradient of sum of absolute differences between the Q*R first blocks and the Q*R second blocks horizontally and vertically, select one of the Q*R first blocks, which is corresponding to the maximum one of the Q*R gradient of sum of absolute differences, to be the first saliency region, and shift the first saliency region by the first offset to obtain the second saliency region, wherein Q and R are positive integers.

11. The image alignment system of claim 7, wherein the offset determination module is further configured to crop the first sub-region and the second sub-region from the first image and the second image, extract a first sub-feature map and a second sub-feature map from the first sub-region and the second sub-region respectively, compare M first sub-areas of the first sub-feature map with M second sub-areas of the second sub-feature map to determine M second candidate offsets between the M first sub-areas and the M second sub-areas, and select the minimum one of the second candidate offsets to be the second offset wherein M is a positive integer.

12. The image alignment system of claim 11, wherein the first sub-feature map and the second sub-feature map represent edge features of the first sub-region and the second sub-region respectively.

13. An image alignment method, comprising steps of:
  scaling a first image and a second image into a first downsized image and a second downsized image by a ratio;
  determining a first offset between the first downsized image and the second downsized image;
  cropping a first sub-region and a second sub-region from the first image and the second image respectively, wherein the first sub-region and the second sub-region comprise distinct feature from other regions;
  determining a second offset between the first sub-region and the second sub-region;
  determining a final offset according to the ratio, the first offset and the second offset; and
  aligning the first image and the second image by the final offset;
  wherein the final offset is determined by an equation as follows:

$$Df=D1*R+D2;$$

wherein Df represents the final offset, D1 represents the first offset, R represents the ratio and D2 represents the second offset.

14. The image alignment method of claim 13, wherein the step of determining the first offset further comprises:
- extracting a first feature map and a second feature map from the first downsized image and the second downsized image; and
- comparing distances of corresponding pixels in the first feature map and the second feature map at least in partial to obtain the first offset.

15. The image alignment method of claim 13, wherein the step of cropping the first sub-region and the second sub-region further comprises:
- slicing the first downsized image and the second downsized image into a plurality of blocks;
- comparing differences between corresponding blocks of the first downsized image and the second downsized image;
- selecting one of the plurality of blocks with minimum difference; and
- cropping the first sub-region corresponding to the selected block in the first image and the second sub-region corresponding to the selected block in the second image.

16. The image alignment method of claim 13, wherein the step of determining the second offset further comprises:
- extracting a first sub-feature map from the first sub-region and a second sub-feature map from the second sub-region; and
- comparing distances of corresponding pixels in the first sub-feature map and the second sub-feature map at least in partial to obtain the second offset.

* * * * *